March 3, 1964

J. A. GAUDET 3,123,757

MOTOR SPEED CONTROL SYSTEM

Filed Sept. 8, 1960

INVENTOR
JAMES ANTHONY GAUDET

BY
Robertson & Smythe
ATTORNEYS

March 3, 1964 J. A. GAUDET 3,123,757
MOTOR SPEED CONTROL SYSTEM
Filed Sept. 8, 1960 2 Sheets-Sheet 2

INVENTOR
JAMES ANTHONY GAUDET
BY
Robertson & Smythe
ATTORNEYS

United States Patent Office 3,123,757
Patented Mar. 3, 1964

3,123,757
MOTOR SPEED CONTROL SYSTEM
James Anthony Gaudet, Lexington, Mass., assignor to Alexander Kusko, Inc., Cambridge, Mass., a corporation of Massachusetts
Filed Sept. 8, 1960, Ser. No. 54,707
12 Claims. (Cl. 318—327)

This invention relates to control circuits and particularly to a circuit for controlling the speed of a direct current motor.

A direct current motor may be operated from an alternating current source by the provision of a rectifying means which will provide direct current of a pulsating nature to the motor for a half cycle of each complete cycle of the alternating current. With such half-cycle operation it is possible to further control the power input to the motor by varying the portion of the half cycle during which the rectifying means is conducting. In this way, speed control during the half cycle mode of operation may be obtained. Operation of the motor with half-wave rectified power may cause undue heating of the motor armature and undesirable pulsations in the torque output.

It is an object of this invention to provide means for furnishing power to a direct current motor during both half cycles of power from an alternating current source.

It is another object of this invention to provide means for controlling the power supplied to a direct current motor during each of the half cycles of the alternating current power.

It is a still further object of this invention to provide a control circuit for providing power to a direct current motor during each of the half cycles of the alternating current supply so as to maintain a predetermined speed of operation for the motor.

In one aspect, the control circuit provided according to this invention may include switch means for connecting a direct current motor to the direct current output of a switch means for converting alternatnig current to direct current. Means are provided for controlling the switch means in response to the alternating current connected thereto in order to actuate the switch means into conduction for a predetermined portion of each half cycle of the alternating current. In this way, the direct current motor is energized during the predetermined portions of conduction during each half cycle of the alternating current supply.

According to a further aspect of this invention, a controlled rectifier is employed for connecting a direct current motor to the pulsating direct current output of a full-wave rectifier connected to an alternating current source. Means are provided for gating the controlled rectifier into conduction in response to the pulsating direct current output of the full-wave rectifier means, so that the controlled rectifier is gated into conduction for a predetermined portion of each half cycle of the alternating current.

In a still further aspect of this invention, a tachometer-generator means is driven by the direct current motor and provides an output signal as a function of the speed of a direct current motor. Means are provided for producing a gating signal for the controlled rectifier connecting the direct current motor to the pulsating direct current output of the full-wave rectifier means connected to an alternating current source. Means are provided for mixing the reference signal and tachometer-generator output signal to provide a signal for gating the controlled rectifier during a portion of each half cycle of the alternating current, so as to maintain a predetermined speed for the direct current motor.

These and other objects, features and advantages of the invention will become apparent from the following detailed description and drawings which are merely exemplary.

Figure 1:
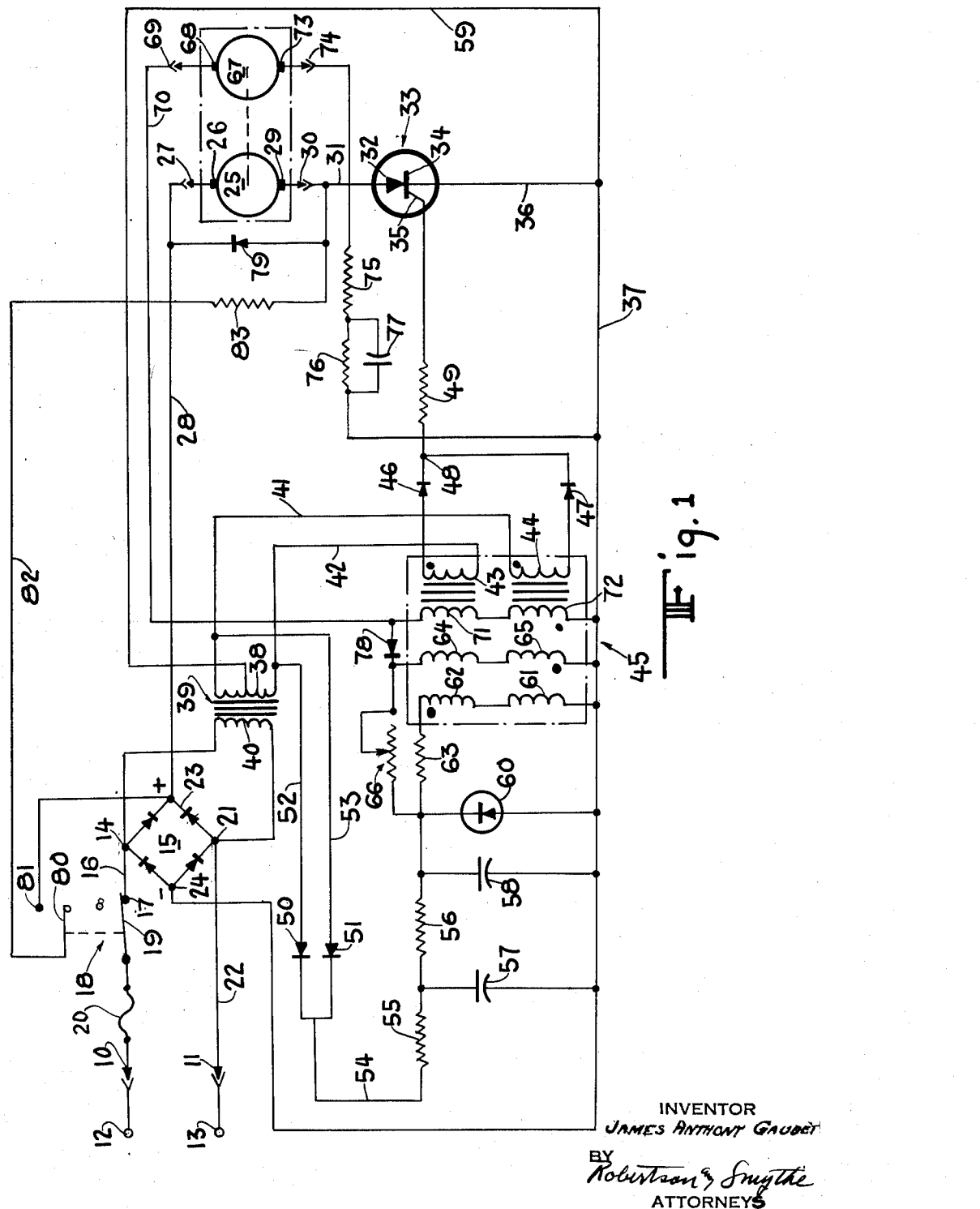
FIG. 1 is a schematic representation of the direct current motor control circuit.

As shown in FIG. 1, the A.C. motor control circuit is energized by means of connections 10 and 11 which lead to terminals 12 and 13 of an A.C. power source (not shown). Terminal 14 of full-wave bridge rectifier 15 is connected to line 16 which leads to contact 17 of switch 18. The connection of terminal 14 to the power source is completed through switch arm 19 and fuse 20. Terminal 21 of bridge rectifier 15 is connected to the power source by means of lead 22. With the rectifier elements of bridge rectifier 15 connected as shown in FIG. 1, terminals 23 and 24 become the positive and negative direct current terminals, respectively.

Direct current motor 25 may be of the type having a permanent magnet field. The armature circuit of motor 25 on one side includes brush 26, connector 27 and lead 28 which is connected to positive terminal 23. On the other side, the armature circuit includes brush 29, connectors 30 and lead 31 which is connected to anode 32 of controlled rectifier 33. Controlled rectifier 33 may be of the silicon type having anode 32, cathode 34 and gate 35. The silicon controlled rectifier is a three-junction semiconductor device of PNPN type. The reverse characteristic of such a controlled rectifier is similar to that of a normal silicon rectifier in that it has an open circuit when the anode is negative and the cathode is positive. The rectifier will block a positive anode to cathode voltage so long as a critical break-over voltage is not exceeded. Upon exceeding the forward break-over voltage, or upon applying an appropriate gate signal, the device will rapidly switch into conduction while at the same time presenting the low forward drop of a single-junction silicon rectifier. Once conduction occurs, the gate has no further control over the rectifier and conduction continues until the voltage applied between anode to cathode is reduced beneath a threshold level necessary to maintain conduction.

Cathode 34 of controlled rectifier 33 is connected by line 36 to line 37 which is in turn connected to negative terminal 24 of bridge rectifier 15. The control circuit for controlled rectifier 33 is energized by secondary winding 38 of center-tapped transformer 39 which has its primary winding 40 connected to terminals 14 and 21 which lead to the A.C. power source. The output of center-tapped transformer 39 is connected by lines 41 and 42 to gate windings 43 and 44, respectively, of magnetic amplifier 45. Self-saturating diodes 46 and 47 are employed. The full-wave rectified output from rectifiers 46 and 47 is joined at connection 48 which is connected to resistor 49 leading to gate 35 of controlled rectifier 33.

The output of center-tapped transformer 39 is additionally connected to full-wave rectifiers 50 and 51 by means of lines 52 and 53, respectively. The full-wave rectified output from rectifiers 50 and 51 is connected by line 54 to a filter network including resistors 55 and 56 and capacitors 57 and 58. A return circuit for the filtered output across capacitor 58 is that through line 37 and line 59 which is connected to the center tap of transformer 39. The filtered power supply is regulated by means of a regulating unit such as zener diode 60 connected in shunt with the filter circuit across capacitor 58. Serially connected bias windings 61 and 62 of magnetic amplifier 45 are connected through resistor 63 to the regulated D.C. power across zener diode 60.

In operation, the control circuit is intended to maintain a predetermined speed of operation of motor 25. A reference speed signal is applied to control windings 64 and 65 of magnetic amplifier 45 by means of speed-setting potentiometer 66 connected to the regulated D.C. power supply at zener diode 60. A signal representing the actual speed of operation of D.C. motor 25 is developed by tachometer-generator 67 which is connected through brush 68, connector 69 and line 70 to feedback windings 71 and 72 of magnetic amplifier 45. Tachometer-generator 67 is mechanically driven by D.C. motor 25 as indicated by the dash line in FIG. 1. Tachometer-generator 67 is also connected through brush 73, connector 74, resistor 75, and the damping or anti-hunt network including resistor 76 and capacitor 77 to line 37.

For a given setting of speed-setting potentiometer 66 and with D.C. motor 25 operating in excess of the set speed, the composite effects of the current from tachometer-generator 67 through feedback windings 71 and 72 and the current from speed-setting potentiometer 66 through control windings 64 and 65 is such as to change the firing angle of magnetic amplifier 45. The increase in reactance effects a reduction in the voltage applied to the armature of D.C. motor 25 so as to reduce its speed to the set value. When the motor approaches the preset value from the error condition, the anti-hunt network including resistor 76 and capacitor 77 suppresses any tendency for the control circuit to hunt.

For the case where D.C. motor 25 is operating below the set value of speed, the composite effect of the currents through the control windings and the feedback windings is such as to affect magnetic amplifier 45 so as to reduce the reactance of gate windings 43 and 44, thereby increasing the voltage applied to D.C. motor 25 in order to accelerate it to the set value of speed.

Diode 78 connected between the input to feedback winding 71 and the input to control winding 64 serves to limit the tachometer-generator 67 voltage output applied to the feedback windings from exceeding the speed setting voltage applied to the control windings. Consequently, whenever the tachometer-generator voltage is sufficiently high so as to exceed that applied to the control winding, diode 78 is switched into conduction in order to apply the tachometer-generator voltage to both the control windings and the feedback windings. The normal state of operation in which the feedback voltage is less than the speed setting voltage is maintained for all states of operation and consequently cannot be reversed.

In the circuit as described, the pulsating D.C. output of full-wave bridge rectifier 15 is applied across D.C. motor 25. Controlled rectifier 33 is gated into conduction by means of the gate circuit of magnetic amplifier 45. The gate circuit of magnetic amplifier 45 is energized by the output of transformer 39 which is subsequently subjected to full-wave rectification by means of rectifiers 46 and 47. Thus the gating signal also is a pulsating D.C.

Figure 2:
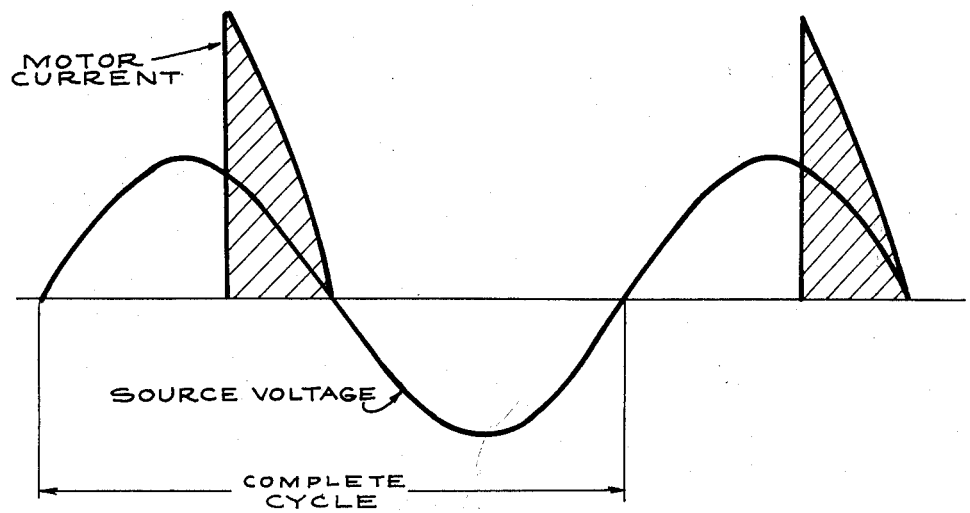
FIG. 2 is a graphical representation of the current applied to a direct current motor employing conventional half-wave motor control.

FIG. 2 represents the operation of a control device, such as a "thyratron" or gas-filled tube, when used to control a D.C. motor. The sinusoidal curve marked "source voltage" represents the alternating current applied between the plate and cathode of the "thyratron" tube. Upon the application of sufficient firing voltage to the grid of the "thyratron" tube, the tube will be thrown into conduction, as indicated by the vertical portion of the curve marked "motor current." The motor current continues to flow in a pulse form until the source voltage reverses and cuts off the conduction of the "thyratron" tube.

Figure 3:
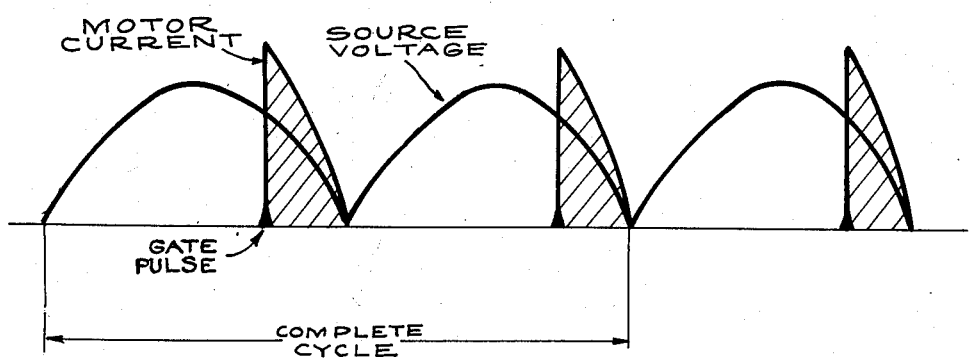
FIG. 3 is a graphical representation of the current applied to a direct current motor utilizing the full wave motor control of the invention.

In FIG. 3, the curve marked "source voltage" represents the pulsating D.C. at terminals 23 and 24 of full-wave rectifier 15 which is applied to motor 25, so that a pulse of current is applied to the motor for each half cycle of alternating current as opposed to the application of a pulse for every other half cycle as shown in FIG. 2. Pulsating D.C. in the control circuit including magnetic amplifier 45 serves to present a gating pulse at connection 48 for each half cycle of the alternating current. The gating pulse is shown in FIG. 3. The effect of the gating pulse upon controlled rectifier 33 is to switch it into conduction as indicated by the vertical portion of the pulse in the curve for motor current in FIG. 3. The operation of magnetic amplifier 45 as conditioned by the bias windings, the control windings and the feedback windings, determines at which point along the half cycle of source voltage the gate pulse or firing point will occur. The location of the gate pulse during the half cycle serves to control the duration of the pulse of motor current. As shown in FIG. 3, the pulse of motor current continues until the source voltage approaches zero, thereby determining the termination of conduction of controlled rectifier 33.

The connection of diode 79 across motor 25 serves to form a free-wheeling circuit. Consequently, when the controlled rectifier 33 cuts off at the end of each half cycle, the collapsing magnetic fields of the armature circuit of motor 25 can induce current to continue to flow in the same direction through motor 25 and through diode 79 in circuit with the motor. In this manner, the rectified half-wave pulses may rise to a relatively high average magnitude after a few cycles of operation, thereby applying an average D.C. current through the motor so as to minimize fluctuations during its operation.

To terminate operation of the motor, switch 18 is operated to remove switch arm 19 from in contact with contact 17. In order to provide regenerative braking for motor 25, switch 18 may be provided with switch arm 80 and contact 81 connected to connection 23 of full-wave rectifier 15. Switch arm 80 is connected by means of line 82 and through resistor 83 to connection 30 at motor 25. Upon opening switch arm 19 and closing switch arm 80, a circuit is completed across motor 25 so that motor 25 acts as a generator with its permanent magnet field providing the excitation, and with resistor 83 serving as the load for the generator. The generator braking provision insures a quick and positive stopping of the motor once switch 18 is actuated.

A wound field D.C. motor (not shown) can be used in place of permanent magnet field motor 25. Also, an armature voltage sensing means can be used. Further, IR drop compensation can be employed.

It should be apparent that variations in the details of the apparatus and process can be made without departing from the spirit or scope of the invention except as defined in the appended claims.

What is claimed is:
1. In a direct current motor control circuit, the combination including means for converting alternating current from a source connected thereto into direct current having a pulsation for each half cycle of said alternating current, single solid state switching device for connecting a direct current motor to the direct current output of said converting means, and means for controlling said device, said controlling means being responsive to said pulsations of said direct current connected thereto to actuate said device into conduction for a predetermined portion of each half cycle of said alternating current, whereby said direct current motor is energized during said predetermined portions.

2. In a direct current motor control circuit, the combination including full-wave rectifier means connected to a source of alternating current, a controlled rectifier for connecting a direct current motor to the pulsating direct current output of said full-wave rectifier means, said controlled rectifier having a gate terminal, and means for gating said controlled rectifier into conduction, said gating means comprising said gate terminal connected to said full-wave rectifier means and being responsive to said pulsating direct current output to gate said controlled rectifier for a predetermined portion of each half cycle of said alternating current, whereby said direct current motor is energized during said predetermined portions.

3. In a direct current motor control circuit, the combination including full-wave rectifier means connected to a source of alternating current, a controlled rectifier for connecting a direct current motor to the pulsating direct current output of said full-wave rectifier means, said controlled rectifier having a gate terminal, means for gating said controlled rectifier into conduction, said gating means comprising said gate terminal connected to the pulsating direct current output of said full-wave rectifier means, and means for controlling the waveform of said pulsating direct current output connected to said gate terminal, said gating means being responsive to said alternating current to gate said controlled rectifier for a predetermined portion of each half cycle of said alternating current, whereby said direct current motor is energized during said predetermined portions.

4. In a direct current motor control circuit, the combination including full-wave rectifier means connected to a source of alternating current, a controlled rectifier for connecting a direct current motor to the pulsating direct current output of said full-wave rectifier means, said controlled rectifier having a gate terminal, additional full-wave rectifier means connected to said source of alternating current, and means for gating said controlled rectifier into conduction, said gating means comprising said gate terminal connected to the pulsating direct current output of said additional full-wave rectifier means, said gating means being responsive to said pulsating direct current to gate said controlled rectifier for a predetermined portion of each half cycle of said alternating current, whereby said direct current motor is energized during said predetermined portions.

5. In a direct current motor control circuit, the combination including full-wave rectifier means connected to a source of alternating current, a controlled rectifier for connecting a direct current motor to the pulsating direct current output of said full-wave rectifier means, said controlled rectifier having a gate terminal, means for gating said controlled rectifier into conduction, said gating means comprising said gate terminal connected to the pulsating direct current output of said full-wave rectifier means, and means in circuit with said gate terminal for controlling the waveform of said pulsating direct current connected to said gate terminal, said gating means being responsive to said pulsating direct current to gate said controlled rectifier for a predetermined portion of each half cycle of said alternating current, whereby said direct current motor is energized during said predetermined portions.

6. In a direct current motor control circuit, the combination including full-wave rectifier means connected to a source of alternating current, a controlled rectifier for connecting a direct current motor to the pulsating direct current output of said full-wave rectifier means, said controlled rectifier having a gate terminal, saturable reactor means having control windings and gate windings, said gate windings connecting said gate terminal to the pulsating direct current output of said full-wave rectifier means, and means for energizing said control windings to control the saturation of said reactor means and to condition the waveform of said pulsating direct current connected to said gate terminal, said pulsating direct current with said conditioned waveform gating said controlled rectifier for a predetermined portion of each half cycle of said alternating current, whereby said direct current motor is energized during said predetermined portions.

7. In a direct current motor control circuit, the combination including full-wave rectifier means connected to a source of alternating current, a controlled rectifier for connecting a direct current motor to the pulsating direct current output of said full-wave rectifier means, said controlled rectifier having a gate terminal, free-wheeling circuit means connected in shunt with said direct current motor, saturable reactor means having control windings and gate windings, said gate windings connecting said gate terminal to the pulsating direct current output of said full-wave rectifier means, and means for energizing said control windings to control the saturation of said reactor means and to condition the waveform of said pulsating direct current connected to said gate terminal, said pulsating direct current with said conditioned waveform gating said controlled rectifier for a predetermined portion of each half cycle of said alternating current, whereby said direct current motor is energized during said predetermined portions.

8. In a direct current motor control circuit, the combination including full-wave rectifier means connected to a source of alternating current, a controlled rectifier for connecting a direct current motor to the pulsating direct current output of said full-wave rectifier means, said controlled rectifier having a gate terminal, tachometer-generator means driven by said direct current motor, means connected to said full-wave rectifier means for producing a predetermined reference gating signal from said pulsating direct current output for a predetermined speed for said direct current motor, said reference signal being related to the output signal of said tachometer-generator at said predetermined speed of said direct current motor, and means for mixing said reference gating signal and the tachometer-generator output signal to provide a signal to said gate terminal for gating said controlled rectifier for a portion of each half cycle of said alternating current, whereby said direct current motor is energized during said portions of each half cycle to maintain said predetermined speed.

9. In a direct current motor control circuit, the combination including full-wave rectifier means connected to a source of alternating current, a controlled rectifier for connecting a direct current motor to the pulsating direct current output of said full-wave rectifier means, said controlled rectifier having a gate terminal, free-wheeling circuit means connected in shunt with said direct current motor, tachometer-generator means driven by said direct current motor, means connected to said full-wave rectifier means for producing a predetermined reference gating signal from said pulsating direct current output for a predetermined speed for said direct current motor, said reference signal being related to the output signal of said tachometer-generator at said predetermined speed of said direct current motor, and means for mixing said reference gating signal and the tachometer-generator output signal to provide a signal to said gate terminal for gating said controlled rectifier for a portion of each half cycle of said alternating current, whereby said direct current motor is energized during said portions of each half cycle to maintain said predetermined speed.

10. In a direct current motor control circuit, the combination including full-wave rectifier means connected to a source of alternating current, a controlled rectifier for connecting a direct current motor to the pulsating direct current output of said full-wave rectifier means, said controlled rectifier having a gate terminal, tachometer-generator means driven by said direct current motor, saturable reactor means having gate windings, control windings and feedback windings, said gate windings connecting said gate terminal to the pulsating direct current output of said full-wave rectifier means, and means for providing a predetermined reference signal to said control windings for a predetermined speed of said direct current motor, said reference signal being related at said predetermined speed to the output signal of said tachometer-generator connected to said feedback windings, the saturation of said reactor means being determined by said signals in said control and feedback windings conditioning the waveform of said pulsating direct current connected to said gate terminal, said pulsating direct current with said conditioned waveform gating said controlled rectifier for a portion of each half cycle of said alternating current, whereby said direct current motor is energized during said portion of each half cycle to maintain said predetermined speed.

11. In a direct current motor control circuit, the combination including full-wave rectifier means connected to a source of alternating current, a controlled rectifier for connecting a direct current motor to the pulsating direct current output of said full-wave rectifier means, said controlled rectifier having a gate terminal, tachometer-generator means driven by said direct current motor, free-wheeling circuit means connected in shunt with said direct current motor, saturable reactor means having gate windings, control windings and feedback windings, said gate windings connecting said gate terminal to the pulsating direct current output of said full-wave rectifier means, and means for providing a predetermined reference signal to said control windings for a predetermined speed of said direct current motor, said reference signal being related at said predetermined speed to the output signal of said tachometer-generator connected to said feedback windings, the saturation of said reactor means being determined by said signals in said control and feedback windings conditioning the waveform of said pulsating direct current connected to said gate terminal, said pulsating direct current with said conditioned waveform gating said controlled rectifier for a portion of each half cycle of said alternating current, whereby said direct current motor is energized during said portion of each half cycle to maintain said predetermined speed.

12. In a direct current motor control circuit, the combination including full-wave rectifier means connected to a source of alternating current, a controlled rectifier for connecting a direct current motor to the pulsating direct current output of said full-wave rectifier means, said controlled rectifier having a gate terminal, tachometer-generator means driven by said direct current motor, saturable reactor means having gate windings, control windings and feedback windings, said gate windings connecting said gate terminal to the pulsating direct current output of said full-wave rectifier means, means for providing a predetermined reference signal to said control windings for a predetermined speed of said direct current motor, said reference signal being related at said predetermined speed to the output signal of said tachometer-generator connected to said feedback windings, the saturation of said reactor means being determined by said signals in said control and feedback windings conditioning the waveform of said pulsating direct current connected to said gate terminal, said pulsating direct current with said conditioned waveform gating said controlled rectifier for a portion of each half cycle of said alternating current, and diode means for connecting said feedback windings to said control windings whenever the level of the signal at said feedback windings exceeds a predetermined relation to the signal of said control windings, whereby said direct current motor is energized during said portions of each half cycle to maintain said predetermined speed.

References Cited in the file of this patent

UNITED STATES PATENTS

| | | |
|---|---|---|
| 2,977,523 | Cockrell | Mar. 28, 1961 |
| 3,064,174 | Dinger | Nov. 13, 1962 |